United States Patent
Ren et al.

(10) Patent No.: US 11,941,786 B2
(45) Date of Patent: Mar. 26, 2024

(54) IMAGE NOISE REDUCTION METHOD AND DEVICE

(71) Applicant: GE Precision Healthcare LLC, Wauwatosa, WI (US)

(72) Inventors: Jialiang Ren, Beijing (CN); Zhoushe Zhao, Beijing (CN); Chen Zhang, Guangzhou (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 257 days.

(21) Appl. No.: 17/343,585

(22) Filed: Jun. 9, 2021

(65) Prior Publication Data

US 2021/0390668 A1    Dec. 16, 2021

(30) Foreign Application Priority Data

Jun. 11, 2020   (CN) .......................... 202010531261.1

(51) Int. Cl.
*G06K 9/00*     (2022.01)
*G06T 5/00*     (2006.01)
*G06T 5/50*     (2006.01)

(52) U.S. Cl.
CPC ............... *G06T 5/002* (2013.01); *G06T 5/50* (2013.01); *G06T 2207/10081* (2013.01);
(Continued)

(58) Field of Classification Search
CPC . G06T 5/002; G06T 5/50; G06T 2207/10081; G06T 2207/20081; G06T 2207/20084; G06T 2207/20221; G06T 2207/10088; G06T 2207/10104; G06T 2207/10108; G06T 2207/10116; G06T 7/0012; G06T 7/11; G06T 7/0004; G06T 2207/20224; G06T 3/60; G06T 11/008; G06T 2207/30168; G06T 19/006;
(Continued)

(56) References Cited

U.S. PATENT DOCUMENTS 10,891,762 B2 *  1/2021  Park .................... G06T 5/002
10,915,990 B2 *  2/2021  Lebel ................... G06T 5/002
11,257,196 B2 *  2/2022  Kaneko ................ G06T 5/002

FOREIGN PATENT DOCUMENTS

CN      107403419 A     11/2017
CN      108492268 A     9/2018
(Continued)

OTHER PUBLICATIONS

S. Cha and T. Moon, "Fully Convolutional Pixel Adaptive Image Denoiser," 2019 IEEE/CVF International Conference on Computer Vision (ICCV), Seoul, Korea (South), 2019 (Year: 2019).*

*Primary Examiner* — Alex Kok S Liew

(57) ABSTRACT

Provided in the present application are an image noise reduction method and device, an imaging system, and a non-transitory computer-readable storage medium. The image noise reduction method includes: processing, based on a first deep learning network, an original scanned object image to acquire a noise image corresponding to the original scanned object image; and acquiring a denoised image based on the original scanned object image and the noise image; wherein the first deep learning network is obtained by training based on low signal-to-noise ratio images and high signal-to-noise ratio images.

18 Claims, 7 Drawing Sheets

(52) U.S. Cl.
CPC ............... *G06T 2207/20081* (2013.01); *G06T 2207/20084* (2013.01); *G06T 2207/20221* (2013.01)

(58) Field of Classification Search
CPC ........... G06T 2207/20182; G06T 2207/30164; G06N 3/08; G06N 3/045; G06N 3/088; G06N 3/084; G06N 20/00; G06N 3/047; G06N 7/01; G06N 3/044; G06N 3/02; G16H 30/20; G06V 10/82; G06V 10/764; G06V 2201/03; G06V 10/454; G06V 10/30; G06V 10/52
See application file for complete search history.

(56) References Cited

FOREIGN PATENT DOCUMENTS

| | | |
|---|---|---|
| CN | 108564553 A | 9/2018 |
| CN | 106600568 B | 10/2019 |

* cited by examiner

IMAGE NOISE REDUCTION METHOD AND DEVICE

TECHNICAL FIELD

The present disclosure relates to image processing, and in particular, to an image noise reduction method and device, an imaging system, and a non-transitory computer-readable storage medium.

BACKGROUND

In the process of computed tomography (CT), a detector is used to acquire data of X-rays passing through a detected object, and then the acquired X-ray data is processed to obtain projection data. Such projection data may be used to reconstruct a CT image. Complete projection data can be used to reconstruct an accurate CT image for diagnosis.

Generally, CT images acquired by scanning with high doses do not have much noise and have relatively high image quality, while CT images acquired by scanning with low doses have much noise and relatively poor image quality. In some cases in which multiple scanning needs to be performed on the same tested object, if scanning with high doses is performed on the same tested object multiple times, a patient is subjected to large amount of radiation, and if scanning with low doses is performed, there would be much noise in the acquired CT image.

Generally, in the post-processing stage of the CT image, a filtering technology is used to filter out noise. However, in this process, the effects of filtering out different types of noise are not the same.

SUMMARY

Provided in the present disclosure are an image noise reduction method and device, an imaging system, and a non-transitory computer-readable storage medium.

Provided in an exemplary embodiment of the present disclosure is an image noise reduction method, comprising: processing, based on a first deep learning network, an original scanned object image to acquire a noise image corresponding to the original scanned object image; and acquiring a denoised image based on the original scanned object image and the noise image; wherein the first deep learning network is obtained by training based on low signal-to-noise ratio images and high signal-to-noise ratio images.

Specifically, the training comprises acquiring the low signal-to-noise ratio images as a original sample image set, and the high signal-to-noise ratio images in the same position as the low signal-to-noise ratio images as a sample reference image set; obtaining the sample noise image set based on the original sample image set and the sample reference image set; and training a neural network by using the original sample image set as an input and the sample noise image set as an output, so as to obtain the first deep learning network.

Further, the low signal-to-noise ratio images comprise CT images acquired at a plurality of different low doses.

Further, the original sample image set comprises a plurality of blocks in the low signal-to-noise ratio images, and the sample reference image set comprises a plurality of blocks in the high signal-to-noise ratio images. Further, the original sample image set comprises respective blocks in the low signal-to-noise ratio images and at least one transformed block obtained after transformation processing is performed on the respective blocks, and the sample reference image set comprises respective blocks in the high signal-to-noise ratio images and at least one transformed block obtained after transformation processing is performed on the blocks. Further, the transformation processing comprises at least one of rotation of at least one angle and mirror flip.

Further, the original sample image set comprises a plurality of low signal-to-noise ratio images acquired based on phantom scanning, and the sample noise image set comprises an actual sample noise image set generated based on the plurality of low signal-to-noise ratio images and the sample reference image set. Further, the sample noise image set further comprises a virtual sample noise image set generated based on a second deep learning network. Further, the virtual sample noise image set comprises at least one virtual noise image generated based on the second deep learning network, and the at least one virtual noise image has a preset similarity to one actual sample noise image in the actual sample noise image set. Further, the original sample image set further comprises a virtual original sample image set acquired based on the sample reference image set and the virtual sample noise image set.

Further provided in an exemplary embodiment of the present disclosure is a non-transitory computer-readable storage medium for storing a computer program, wherein when executed by a computer, the computer program causes the computer to execute instructions for the image noise reduction method described above.

Further provided in an exemplary embodiment of the present disclosure is an image noise reduction device, comprising a noise image generation module and a denoised image synthesis module. The noise image generation module is configured to process, based on a first deep learning network, an original scanned object image to acquire a noise image corresponding to the original scanned object image, wherein the first deep learning network is obtained by training based on low signal-to-noise ratio images and high signal-to-noise ratio images; and the denoised image synthesis module is configured to acquire a denoised image based on the original scanned object image and the noise image.

Specifically, the image noise reduction device further comprises a first training module configured to acquire the first deep learning network, The first training module is further configured to acquire the low signal-to-noise ratio images as a original sample image set, and the high signal-to-noise ratio images in the same position as the low signal-to-noise ratio images as a sample reference image set; acquire the sample noise image set based on the original sample image set and the sample reference image set; and train a neural network by using the original sample image set as an input and the sample noise image set as an output, so as to obtain the first deep learning network.

Further, the low signal-to-noise ratio images comprise CT images acquired at a plurality of different low doses.

Further, the original sample image set comprises a plurality of blocks in the low signal-to-noise ratio images, and the sample reference image set comprises a plurality of blocks in the high signal-to-noise ratio images. Further, the original sample image set comprises respective blocks in the low signal-to-noise ratio images and at least one transformed block obtained after transformation processing is performed on the respective blocks, and the sample reference image set comprises respective blocks in the high signal-to-noise ratio images and at least one transformed block obtained after transformation processing is performed on the blocks. Further, the transformation processing comprises at least one of rotation of at least one angle and mirror flip.

Further, the original sample image set comprises a plurality of low signal-to-noise ratio images acquired based on phantom scanning, and the sample noise image set comprises an actual sample noise image set generated based on the plurality of low signal-to-noise ratio images and the sample reference image set. Further, the image noise reduction device further comprises a second training module configured to generate a second deep learning network of a virtual sample noise image set based on the actual sample noise image set. Further, the virtual sample noise image set comprises at least one virtual noise image generated based on the second deep learning network, and the at least one virtual noise image has a preset similarity to one actual sample noise image in the actual sample noise image set. Further, the original sample image set further comprises a virtual original sample image set acquired based on the sample reference image set and the virtual sample noise image set.

Further provided in an exemplary embodiment of the present disclosure is an imaging system comprising the above image noise reduction device.

Other features and aspects will become clear through the following detailed description, accompanying drawings and claims.

BRIEF DESCRIPTION OF THE DRAWINGS

The present disclosure may be better understood by describing exemplary embodiments of the present disclosure with reference to accompanying drawings, in which.

DETAILED DESCRIPTION OF THE EMBODIMENTS

Specific implementations of the present disclosure will be described in the following. It should be noted that during the specific description of the implementations, it is impossible to describe all features of the actual implementations in detail in this description for the sake of brief description. It should be understood that in the actual implementation of any of the implementations, as in the process of any engineering project or design project, a variety of specific decisions are often made in order to achieve the developer's specific objectives and meet system-related or business-related restrictions, which will vary from one implementation to another. Moreover, it can also be understood that although the efforts made in such development process may be complex and lengthy, for those of ordinary skill in the art related to content disclosed in the present disclosure, some changes in design, manufacturing, production or the like based on the technical content disclosed in the present disclosure are only conventional technical means, and should not be construed as that the content of the present disclosure is insufficient.

Unless otherwise defined, the technical or scientific terms used in the claims and the description are as they are usually understood by those of ordinary skill in the art to which the present disclosure pertains. The words "first," "second" and similar words used in the description and claims of the patent application of the present disclosure do not denote any order, quantity or importance, but are merely intended to distinguish between different constituents. "One," "a(n)" and similar words are not meant to be limiting, but rather denote the presence of at least one. The word "include," "comprise" or a similar word is intended to mean that an element or article that appears before "include" or "comprise" encompasses an element or article and equivalent elements that are listed after "include" or "comprise," and does not exclude other elements or articles. The word "connect," "connected" or a similar word is not limited to a physical or mechanical connection, and is not limited to a direct or indirect connection.

As used in the present disclosure, the term "detected object" may include any object being imaged.

It should be noted that from the perspective of those of ordinary skill in the art or related art, such description should not be construed as limiting the present disclosure only to a CT system. In fact, the image noise reduction method and device described here may be reasonably applied to other imaging fields in medical fields or non-medical fields, such as X-ray systems, PET systems, SPECT systems, MR systems, or any combination thereof.

Figure 1:
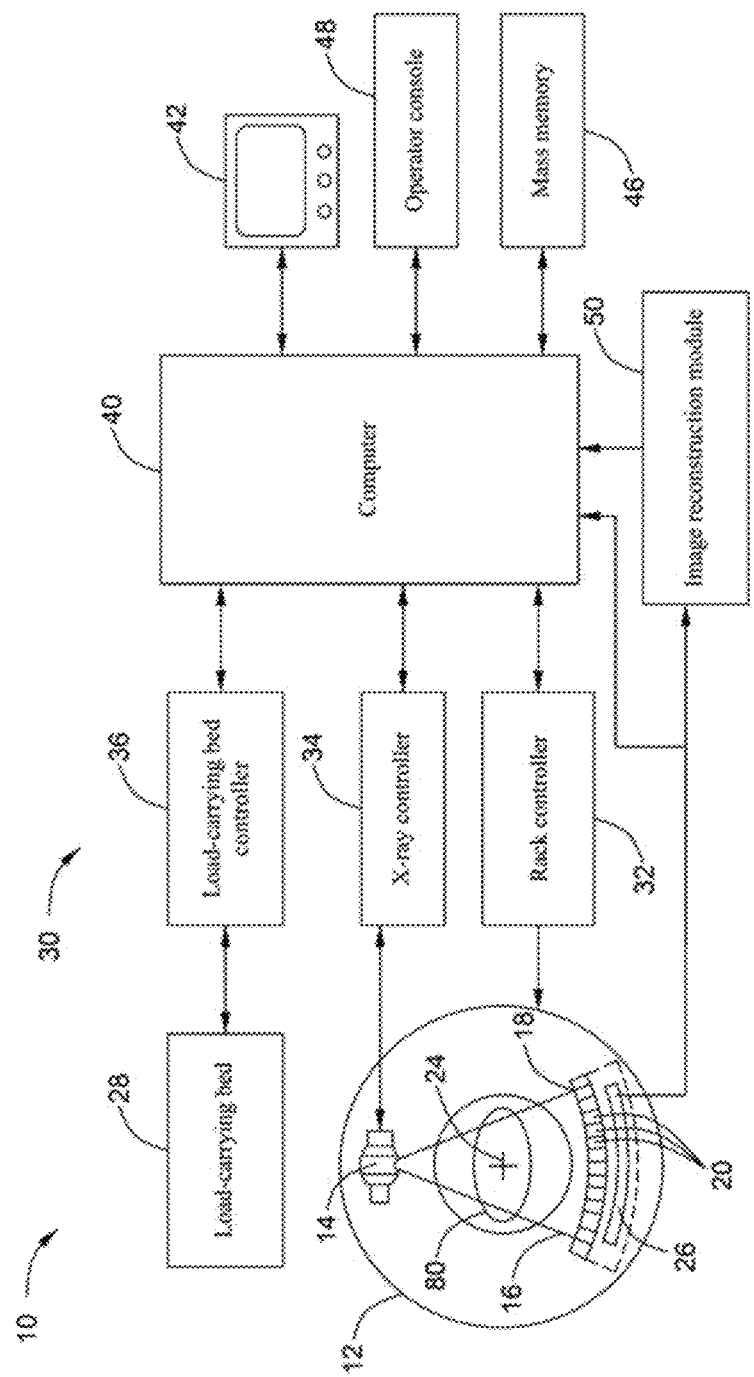
FIG. 1 is a schematic diagram of a CT system according to some embodiments of the present disclosure.

FIG. 1 is a schematic diagram of a CT system 10 according to some embodiments of the present disclosure. As shown in FIG. 1, the system 10 includes a rack 12. An X-ray source 14 and a detector array 18 are disposed opposite to each other on the rack 12. The detector array 18 is formed by a plurality of detectors 20 and a data acquisition system (DAS) 26. The DAS 26 is configured to convert sampled analog data of analog attenuation data received by the plurality of detectors 20 into digital signals for subsequent processing. In some embodiments, the system 10 is used for acquiring projection data of a detected object at different angles. Thus, components on the rack 12 are used for rotating around a rotation center 24 to acquire projection data. During rotation, the X-ray radiation source 14 is configured to project X-rays 16 that penetrate the detected object toward the detector array 18. The attenuated X-ray beam data is preprocessed and then used as projection data of a target volume of the object. An image of the detected object may be reconstructed based on the projection data. The reconstructed image may display internal features of the detected object. These features include, for example, the lesion, size, and shape of a body tissue structure. The rotation center 24 of the rack also defines a center of a scanning field 80.

The system 10 further includes an image reconstruction module 50. As described above, the DAS 26 samples and digitizes the projection data acquired by the plurality of detectors 20. Next, the image reconstruction module 50 performs high-speed image reconstruction based on the aforementioned sampled and digitized projection data. In some embodiments, the image reconstruction module 50 stores the reconstructed image in a storage apparatus or a mass memory 46. Or, the image reconstruction module 50 transmits the reconstructed image to a computer 40 to generate information for diagnosing and evaluating patients.

Although the image reconstruction module 50 is illustrated as a separate entity in FIG. 1, in some embodiments, the image reconstruction module 50 may form part of the computer 40. Or, the image reconstruction module 50 may not exist in the system 10, or the computer 40 may perform one or a plurality of functions of the image reconstruction module 50. Furthermore, the image reconstruction module 50 may be located at a local or remote location and may be connected to the system 10 using a wired or wireless communication network. In some embodiments, computing resources with a centralized cloud communication network may be used for the image reconstruction module 50.

In some embodiments, the system 10 includes a control mechanism 30. The control mechanism 30 may include an X-ray controller 34 configured to provide power and timing signals to the X-ray radiation source 14. The control mechanism 30 may further include a rack controller 32 configured to control a rotational speed and/or position of the rack 12 based on imaging requirements. The control mechanism 30 may further include a load-carrying bed controller 36 configured to drive a load-carrying bed 28 to move to a suitable location so as to position the detected object in the rack 12, thereby acquiring the projection data of the target volume of the detected object. Furthermore, the load-carrying bed 28 includes a driving device, where the load-carrying bed controller 36 may control the driving device to control the load-carrying bed 28.

In some embodiments, the system 10 further includes the computer 40, where data sampled and digitized by the DAS 26 and/or an image reconstructed by the image reconstruction module 50 is transmitted to a computer or the computer 40 for processing. In some embodiments, the computer 40 stores the data and/or image in a storage apparatus such as a mass memory 46. The mass memory 46 may include a hard disk drive, a floppy disk drive, a CD-read/write (CD-R/W) drive, a digital versatile disc (DVD) drive, a flash drive, and/or a solid-state storage device. In some embodiments, the computer 40 transmits the reconstructed image and/or other information to a display 42, where the display 42 is communicatively connected to the computer 40 and/or the image reconstruction module 50. In some embodiments, the computer 40 may be connected to a local or remote display, printer, workstation and/or similar apparatus, for example, connected to such apparatuses of medical institutions or hospitals, or connected to a remote apparatus through one or a plurality of configured wires or a wireless communication network such as the Internet and/or a virtual private communication network.

Furthermore, the computer 40 may provide commands and parameters to the DAS 26 and the control mechanism 30 (including the rack controller 32, the X-ray controller 34, and the load-carrying bed controller 36) based on user provision and/or system definition, so as to control system operation, for example, data acquisition and/or processing. In some embodiments, the computer 40 controls system operation based on user input. For example, the computer 40 may receive user input such as commands, scanning protocols and/or scanning parameters, through an operator console 48 connected thereto. The operator console 48 may include a keyboard (not shown) and/or touch screen to allow a user to input/select commands, scanning protocols and/or scanning parameters. Although FIG. 1 exemplarily shows only one operator console 48, the computer 40 may be connected to more operating consoles, for example, for inputting or outputting system parameters, requesting medical examination and/or viewing images.

In some embodiments, the system 10 may include or be connected to an image storage and transmission system (PACS) (not shown in the figure). In some embodiments, the PACS is further connected to a remote system such as a radiology information system, a hospital information system, and/or an internal or external communication network (not shown) to allow operators at different locations to provide commands and parameters and/or access image data.

The method or process described further below may be stored as executable instructions in a non-volatile memory in a computing apparatus of the system 10. For example, the computer 40 may include the executable instructions in the non-volatile memory, and may use the method described herein to automatically perform part or all of the scanning process, for example, select suitable protocols and determine suitable parameters. As another example, the image reconstruction module 50 may include the executable instructions in the non-volatile memory, and may use the method described herein to perform image reconstruction tasks.

The computer 40 may be configured and/or arranged for use in different manners. For example, in some implementations, a single computer 40 may be used; in other implementations, a plurality of computers 40 are configured to work together (for example, based on distributed processing configuration) or separately, where each computer 40 is configured to handle specific aspects and/or functions, and/or process data for generating models used only for a specific medical imaging system 10. In some implementations, the computer 40 may be local (for example, in the same position as one or a plurality of medical imaging systems 10, for example, in the same facility and/or the same local communication network); in other implementations, the computer 40 may be remote and thus can only be accessed via a remote connection (for example, via the Internet or other available remote access technologies).

Figure 2:
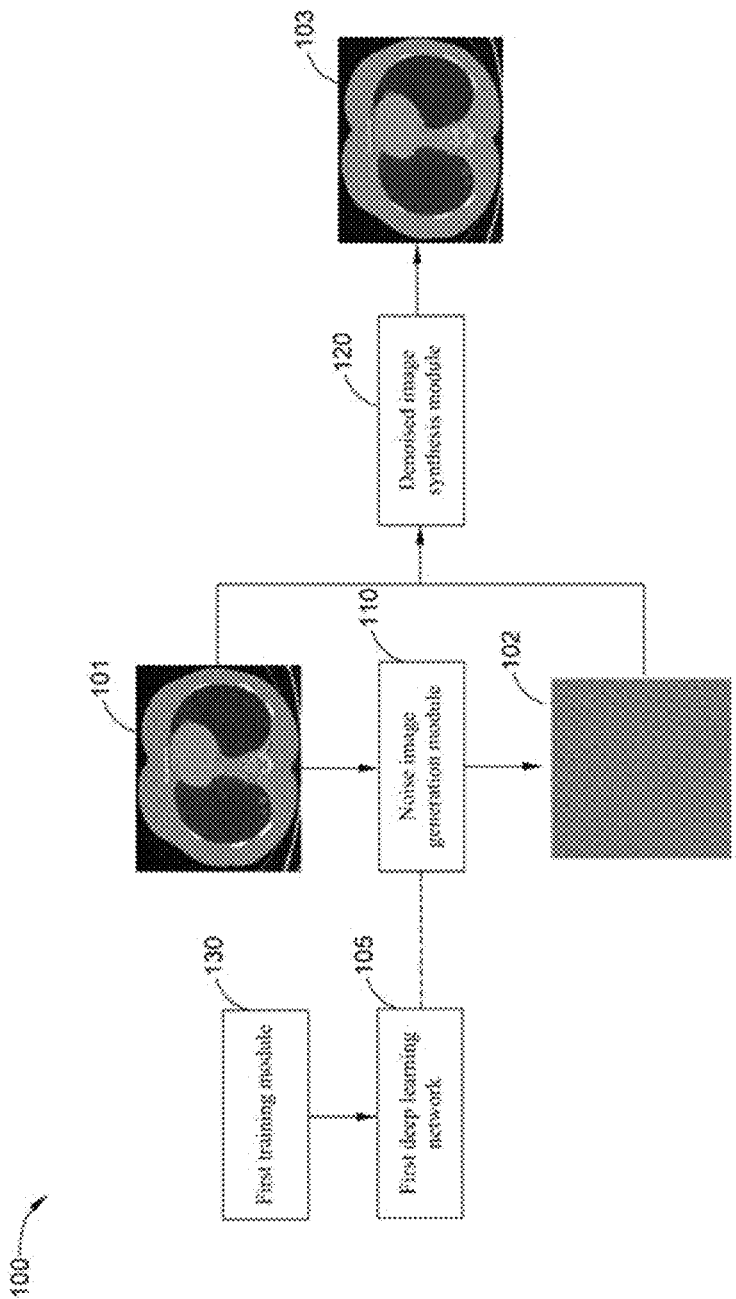
FIG. 2 is a schematic diagram of an image noise reduction device according to some embodiments of the present disclosure.

FIG. 2 shows an image noise reduction device 100 according to some embodiments of the present disclosure. As shown in FIG. 2, the image noise reduction device 100 includes a noise image generation module 110 and a denoised image synthesis module 120.

The noise image generation module 110 is configured to process, based on a first deep learning network 105, an original scanned object image 101 to acquire a noise image 102 corresponding to the original scanned object image 101, wherein the first deep learning network 105 is obtained by training based on low signal-to-noise ratio images and high signal-to-noise ratio images. The denoised image synthesis module 120 is configured to acquire a denoised image 103 based on the original scanned object image 101 and the noise image 102.

The noise image generation module 110 first preprocesses the original scanned object image 101 before processing the original scanned object image 101 based on the first deep learning network 105. The preprocessing includes dividing the original scanned object image 101 into blocks of the same size (for example, 40*40) as the blocks in the training image, and processing each of the divided blocks based on the first deep learning network 105 to obtain a noise image corresponding to each of the blocks.

In some embodiments, the denoised image synthesis module 120 may first obtain, based on each block in the original scanned object image 101 and a noise image corresponding to the block, a denoised image corresponding to the each block, and then splice the denoised images corresponding to all the blocks to obtain a complete denoised image. In some other embodiments, the denoised image synthesis module 120 may first splice noise images corresponding to each block in the original scanned object image 101 to obtain a complete noise image, and then acquire a denoised image based on the original scanned object image 101 and the complete noise image. In some embodiments, the denoised image synthesis module 120 may acquire a denoised image 103 by subtracting the noise image 102 from the original scanned object image 101.

The image noise reduction device 100 further includes a first training module 130 configured to acquire a first deep learning network 105. In some embodiments, the first training module 130 may respectively divide the low signal-to-noise ratio images and the high signal-to-noise ratio images into a plurality of blocks, for example, blocks with a size of 40*40, and train a deep learning network by using blocks of the low signal-to-noise ratio image and blocks of the high signal-to-noise ratio image corresponding to the same position respectively as a target input and an expected output.

The first deep learning network 105 may be implemented by preparation of training data, selection and construction of a network model, and training, testing, and optimization of the network. In some embodiments, a training data set (including the low signal-to-noise ratio images and the high signal-to-noise ratio images) is stored in a storage device (such as a mass memory 46 shown in FIG. 1) of a CT system, and the first training module 130 may train and/or update the network by acquiring the training data set.

Figure 3:
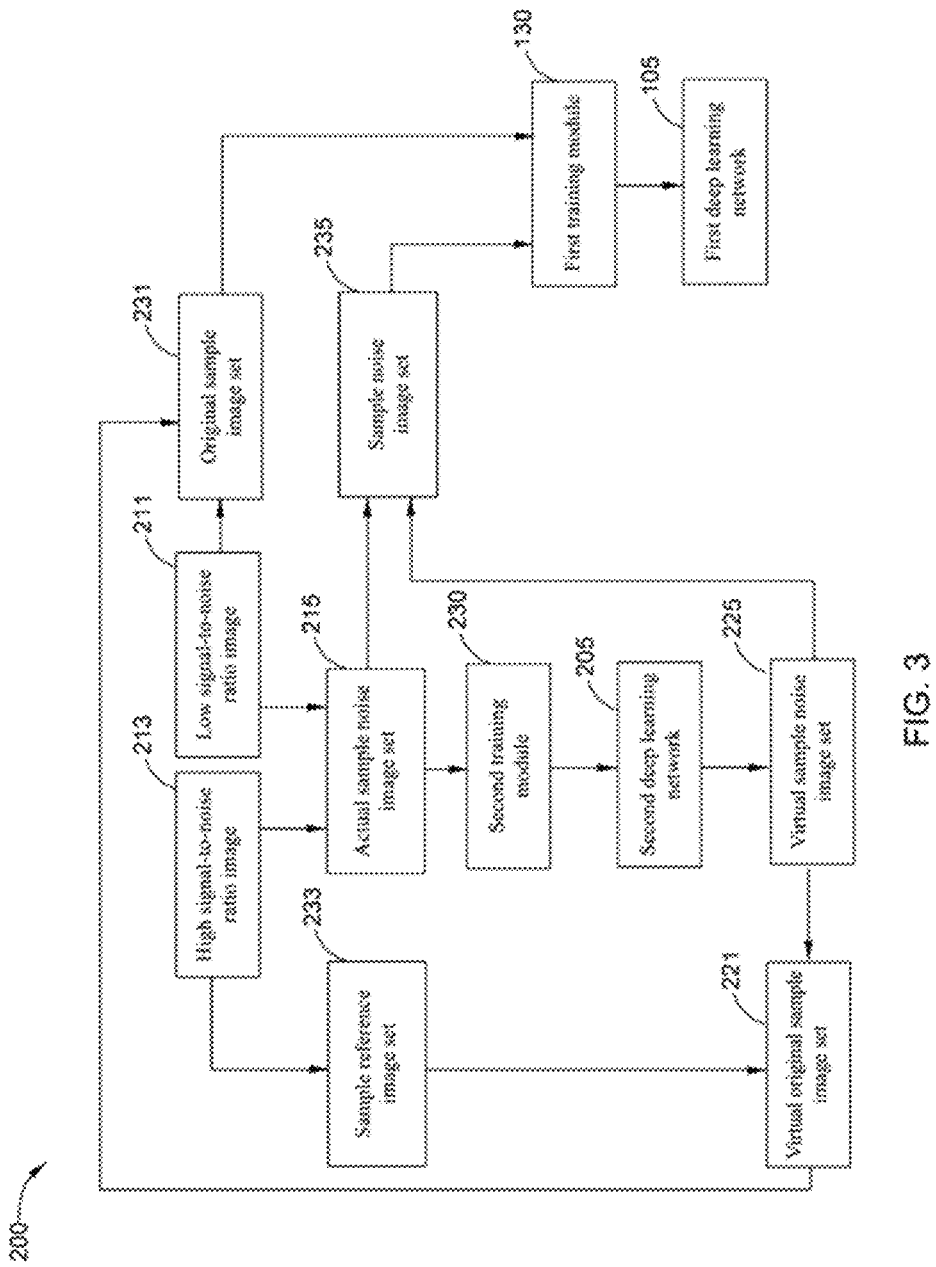
FIG. 3 is a schematic diagram of training of a first deep learning network according to some embodiments of the present disclosure.

FIG. 3 shows a schematic diagram of training of a first deep learning network according to some embodiments of the present disclosure. As shown in FIG. 3, in some embodiments, the training module 130 is further configured to implement the following functions.

First, the training module 130 is further configured to acquire the low signal-to-noise ratio images 211 as a original sample image set 231, and the high signal-to-noise ratio images 213 in the same position as the low signal-to-noise ratio images 211 as a sample reference image set 233.

In some embodiments, during the CT scan, a tube voltage includes 80 kV, 90 kV, 100 kV, 110 kV, 120 kV, and 140 kV, and a tube current includes 30 mA, 60 mA, 90 mA, 120 mA, 150 mA, 180 mA, 101 mA, 240 mA, 270 mA, and 300 mA. Generally, a high dose refers to a dose of a relatively high X-ray radiation intensity generated by the tube, at which a CT image obtained by scanning a scanned object is a reference image that does not include noise or is substantially noise-free, such as the dose generated when the tube is operated at 120 kV/300 mA or 140 kV/300 mA or another voltages/current. A low dose refers to a dose of a relatively low X-ray radiation intensity generated by the tube. At the dose, the CT image acquired by scanning the scanned object comprises more noise. That is, in the present embodiment, the original sample image set 231 includes a medical image with a relatively low signal-to-noise ratio obtained by scanning the scanned object, that is, the image comprise noise. Generally, the original sample image set 231 includes a medical image acquired at a low dose. The sample reference image set 233 includes a medical image with a relatively high signal-to-noise ratio obtained by scanning the scanned object, that is, the image is substantially noise-free. Generally, the original sample image set 231 includes a medical image acquired at a high dose. In some embodiments, the original sample image set 231 and the sample reference image set 233 are acquired by scanning a phantom.

The term "substantially noise-free" means that the noise in the image is substantially negligible, and there is no effect on the image quality and determination of lesion.

Specifically, the low signal-to-noise ratio images 211 include CT images acquired at a plurality of different low doses, that is, the original sample image set 231 includes CT images obtained at a plurality of different low doses.

In addition, the low signal-to-noise ratio images 211 may also include a magnetic resonance image with a low signal-to-noise ratio acquired based on a magnetic resonance imaging (MRI) system.

In some embodiments, the original sample image set 231 and the sample reference image set 233 may be acquired directly from a medical imaging system (such as a CT system, an MRI system, a PET system, or a PET-CT system), and may also be acquired from a workstation or PACS.

In some embodiments, the original sample image set 231 includes a plurality of blocks in the low signal-to-noise ratio images 211, and the sample reference image set 233 includes a plurality of blocks in the high signal-to-noise ratio images 213. Specifically, the CT images are all divided into a plurality of blocks, for example, blocks with a size of 40*40, and then each of the blocks is trained respectively. By dividing each CT image into a plurality of blocks, the accuracy of training of a deep learning network can be improved to obtain a more accurate denoised image.

In some embodiments, the original sample image set 231 includes respective blocks in the low signal-to-noise ratio images 211 and at least one transformed block obtained after transformation processing is performed on the respective blocks, and the sample reference image set 233 includes respective blocks in the high signal-to-noise ratio images 231 and at least one transformed block obtained after transformation processing is performed on the blocks. Specifically, the transformation processing includes at least one of rotation of at least one angle and mirror flip, such as one or a plurality of rotation of each block of 90 degrees, 180 degrees, and 270 degrees or mirror flip. Different processing is performed on a plurality of blocks, so that more training data can be obtained to better train the deep learning network, so as to avoid the situation in which the deep learning network cannot be identified or cannot be denoised due to different shooting angles.

Second, the training module 130 is further configured to acquire a sample noise image set 235 based on the original sample image set 231 and the sample reference image set 233.

In some embodiments, the original sample image set 231 includes a plurality of low signal-to-noise ratio images 211 acquired based on phantom scanning. The sample noise image set 235 includes a actual sample noise image set 215 generated based on the plurality of low signal-to-noise ratio images 211 and the sample reference image set 233. Specifically, since the high-dose CT image is a substantially noise-free reference image, by subtracting the substantially noise-free reference image (high signal-to-noise ratio image) from the original image with more noise (low signal-to-noise ratio image), the noise image actually obtained based on a phantom scanning can be acquired. The sample noise image set 235 includes a plurality of actually obtained noise images.

In some other embodiments, the sample noise image set 235 further includes a virtual sample noise image set 225, and the virtual sample noise image set 225 is generated based on the second training module 230. The original sample image set 231 further includes a virtual original sample image set 221 acquired based on the sample reference image set 233 and the virtual sample noise image set 225.

The second training module 230 is configured to generate a second deep learning network 205 of a virtual sample noise image set 225 having a preset similarity based on each actual sample noise image in the actual sample noise image set 215.

The virtual sample noise image set 225 refers to images similar to the actual sample noise image set 215 generated based on the second deep learning network 205, but the virtual sample noise image set is not a actual sample noise image set 215 obtained by subtracting the high signal-to-noise ratio images 213 from the low signal-to-noise ratio images 211.

The virtual original sample image set 221 refers to images comprising more noise obtained by adding the virtual sample noise image set 225 and the sample reference image set 233.

In order to increase the amount of training data of the deep learning network, in the present disclosure, more virtual noise images are generated based on deep learning, so that the first deep learning network can include more types of noise, facilitating accuracy of denoising. Specifically, the second training module 230 may generate at least one virtual sample noise image 225 (or any block in the image) similar to the actual sample noise image 215 based on any actual sample noise image (or any block in the image) in the actual sample noise image set 215. The virtual sample noise image 225 is not obtained by subtracting the high signal-to-noise ratio images 213 from the low signal-to-noise ratio images 211, but is generated based on deep learning. In some embodiments, for one actual sample noise image 215, a plurality of virtual sample noise images 225 can be obtained, for example, 3, so as to obtain as many noise images as possible.

Therefore, the original sample image set 231 includes a plurality of low signal-to-noise ratio images 211 acquired based on phantom scanning and virtual original sample images 221, and the sample noise image set 235 includes a actual sample noise image set 215 and a virtual sample noise image set 225 generated based on the second deep learning network 205, where the virtual original sample image set 221 is obtained by adding the virtual sample noise image set 225 and the sample reference image set 233.

In some embodiments, the second deep learning network 205 is obtained by training based on generative adversarial networks (GAN) or other well-known models. A GAN model includes a generative model and a discriminative model. By inputting an actual sample noise image as a reference image into the discriminative model, the discriminative model can determine a similarity between an image generated by the generative model and the reference image. When a preset similarity is reached, the second deep learning network 205 can output a corresponding virtual sample noise image, that is, for one actual sample noise image, one or a plurality of corresponding virtual sample noise images can be outputted. Generating more noise images by the second deep learning network is actually a method of data amplification. Based on the actual noise images, more similar virtual sample noise images can be generated, and the set of these noise images (including the virtual sample noise image set and the actual sample noise image set) is inputted into the first deep learning network, thereby also improving the capability of noise reduction of the first deep learning network. The specific model of the second deep learning network will be described in detail below. The term "preset similarity" refers to a degree of similarity between an image generated in the GAN and a preset reference image, such as 90%, preferably 95%, and more preferably 98%.

Third, the training module 130 is further configured to train a neural network by using the original sample image set 231 as an input and the sample noise image set 235 as an output, so as to obtain the first deep learning network 105. Specifically, the original sample image set 231 includes low signal-to-noise ratio images 211 obtained by scanning a phantom at different low doses and a virtual original sample image set 221, and the sample noise image set 235 includes a actual sample noise image set 215 and a virtual sample noise image set 225 generated based on the second deep learning network 205.

Figure 4:
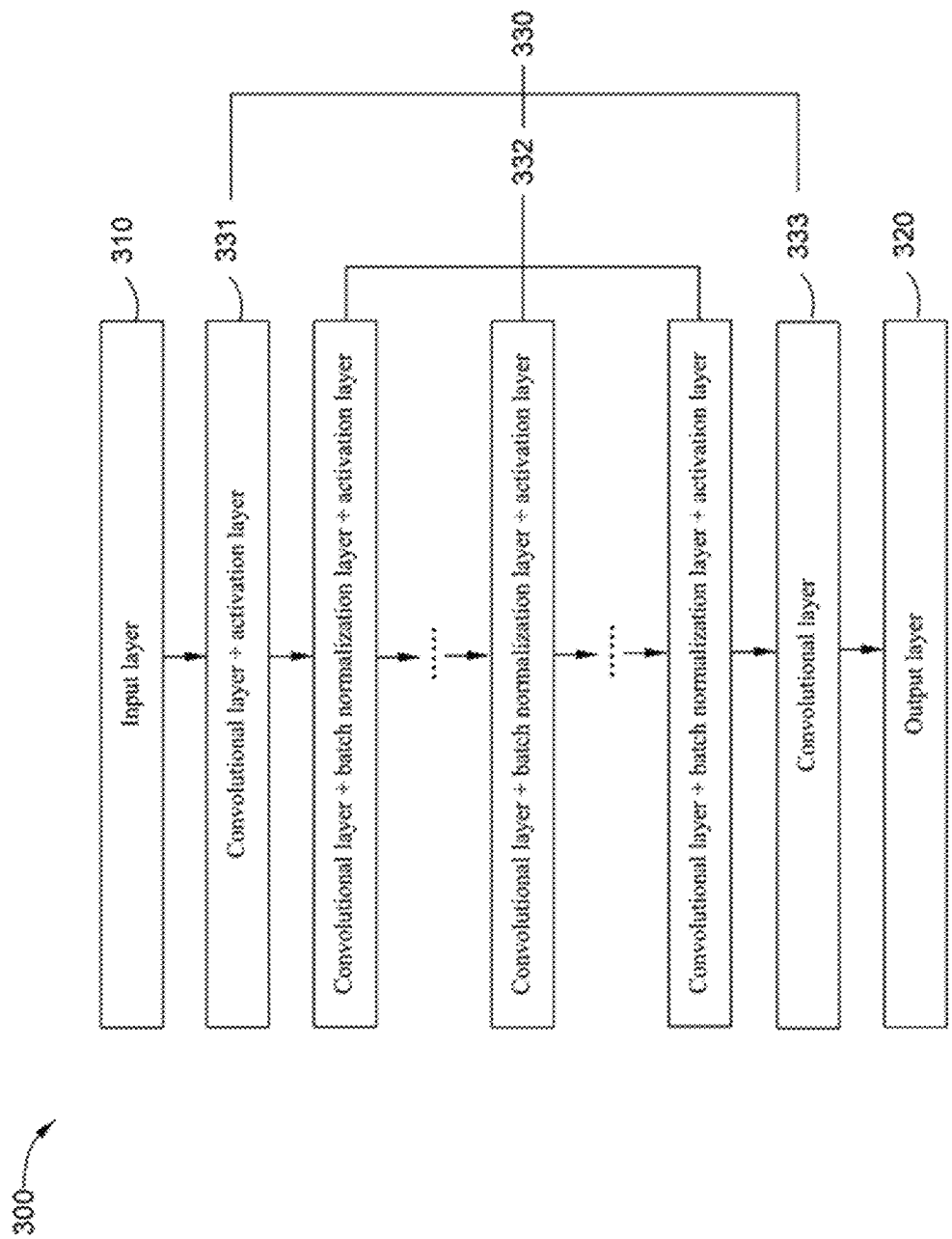
FIG. 4 is a schematic diagram of a first deep learning network according to some embodiments of the present disclosure.

In some embodiments, the first deep learning network is obtained by training based on a residual learning of deep CNN for image denoising (DNCNN) or other well-known models. FIG. 4 shows a schematic diagram of a first deep learning network 300 according to some embodiments of the present disclosure. As shown in FIG. 4, the first deep learning network 300 includes an input layer 310, an output layer 320, and a processing layer (or referred to as a hidden layer) 330.

In some embodiments, the input layer 310 is configured to preprocess input data or images, such as, removal of mean value, normalization, or dimensionality reduction.

In some embodiments, the processing layer 330 includes a first processing layer 331, a second processing layer 332, and a third processing layer 333, where the first processing layer 331 includes a convolutional layer and an activation layer (or an excitation layer), the second processing layer 332 includes a convolutional layer, a batch normalization layer, and an activation layer, and the third processing layer 333 includes a convolutional layer. The processing layer 330 may include one or more second processing layers 332.

Specifically, the convolutional layer uses a convolution kernel of with a size of 3*3 for feature extraction. The activation layer actually performs a nonlinear mapping on an output result of the convolutional layer, so that nonlinear factors can be introduced to solve problems that cannot be solved by a linear model. Specifically, an activation function used by the first deep learning network is a rectified linear unit (ReLU) to speed up the iteration. By batch normalization in each second processing layer 332, the distribution of an input value of any neuron in each layer of neural network can be forced back to a standard normal distribution with a mean value of 0 and a variance of 1, so that the deviation between the layers will not be too large, which can not only speed up and stabilize the training process, but also improve the performance of noise reduction.

Each convolutional layer includes several neurons, and the number of the neurons in each layer may be the same or set differently as required. Based on the original sample image set (known input) and the sample noise image set (expected output), the number of processing layers in a network and the number of neurons in each processing layer are set, and a weight and/or bias of the network is estimated (or adjusted or calibrated), so as to identify a mathematical relationship between the known input and the expected output and/or identify a mathematical relationship between the input and output of each layer.

Specifically, when the number of neurons in one of the layers is n, and values corresponding to the n neurons are $X_1$, $X_2$, . . . and $X_n$; the number of neurons in a next layer connected to the layer is m, and values corresponding to the m neurons are $Y_1, Y_2, \ldots$ and $Y_m$, and the two adjacent layers may be represented as:

$$Y_j = f(\Sigma_{i=1}^n W_{ji} X_i + B_j)$$

where $X_i$ represents a value corresponding to an i-th neuron of the previous layer, $Y_j$ represents a value corresponding to a j-th neuron of the next layer, $W_{ji}$ represents a weight, and $B_j$ represents a bias. In some embodiments, the function f is a rectified linear function.

Thus, the weight $W_{ji}$ and/or bias $B_j$ is adjusted so that the mathematical relationship between the input and output of each layer can be identified, and thus a loss function converges, so as to train the network. In some embodiments, the loss function used in the first deep learning network is mean square error.

When the network is created or trained, as long as the original scanned object image including noise is inputted into the network, the denoised image can be acquired.

Figure 5:
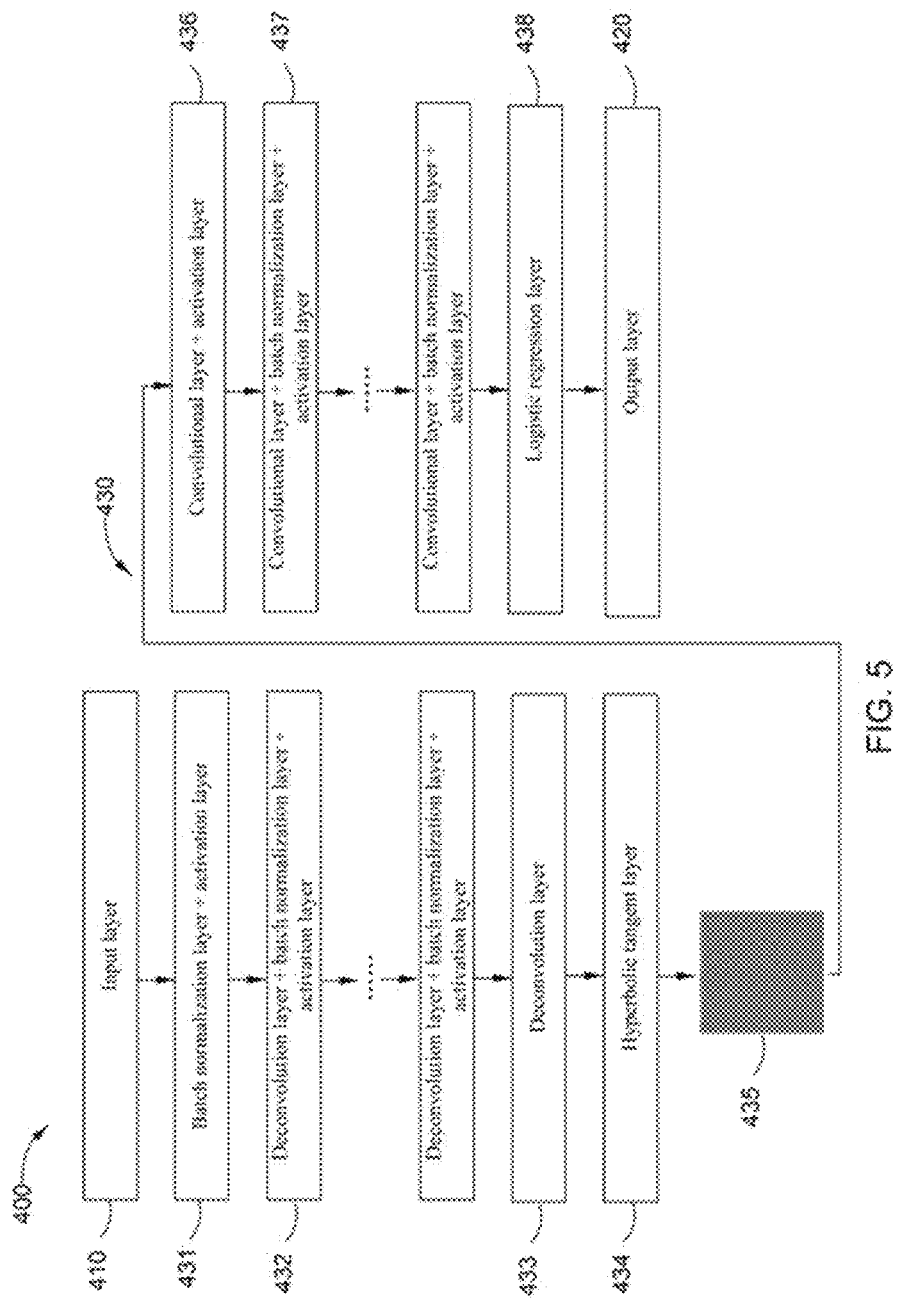
FIG. 5 is a schematic diagram of a second deep learning network according to some embodiments of the present disclosure.

FIG. 5 shows a schematic diagram of a second deep learning network 400. As shown in FIG. 5, the second deep learning network 400 includes an input layer 410, an output layer 420, and a processing layer (or referred to as a hidden layer) 430.

In some embodiments, the input layer 410 is configured to normalize input random data (such as random noise), and project and transform the data to obtain a random image.

In some embodiments, the processing layer 430 includes a generation module layer (431-434) and a discrimination module layer (436-438). The generation module layer is configured to generate a noise image 435 based on an input random image, and the discrimination module layer is configured to determine whether the noise image 435 is a real picture (reference image, i.e., a actual sample noise image set).

Specifically, the generation module layer includes a batch normalization layer and an activation layer 431, one or a plurality of deconvolution layers, a batch normalization layer and an activation layer 432, a deconvolution layer 433, and a hyperbolic tangent layer 434. The discrimination module layer includes a convolutional layer and an activation layer 436, one or a plurality of convolutional layers, a batch normalization layer, an activation layer 437, and a logistic regression layer 438.

Specifically, the deconvolution layer is configured to increase the size of an image, e.g., from 64*64 to 128*128, and the convolutional layer is configured to extract features. The activation layer actually performs a nonlinear mapping on an output result of the convolutional layer, so that nonlinear factors can be introduced to solve problems that cannot be solved by a linear model. Specifically, the activation function used in the generation module layer is a rectified linear unit (ReLU), and the activation function used in the discrimination module layer is a leaky ReLU. The hyperbolic tangent is one type of the activation functions, with an output between −1 and 1, and with a mean value of 0, facilitating learning of the next-layer network. Logistic regression is used for classification.

By batch normalization, the distribution of an input value of any neuron in each layer of neural network can be forced back to a standard normal distribution with a mean value of 0 and a variance of 1, so that the deviation between the layers will not be too large, which can not only speed up and stabilize the training process, but also improve the performance of noise reduction.

In some embodiments, the loss function of the generation module layer in the second deep learning network is maximum likelihood, and the usage function of the discrimination module layer is cross entropy.

In one embodiment, although the configuration of the deep learning network is guided by dimensions such as prior knowledge, input, and output of an estimation problem, optimal approximation of required output data is implemented depending on or exclusively according to input data. In various alternative implementations, clear meaning may be assigned to some data representations in the deep learning network using some aspects and/or features of data, an imaging geometry, a reconstruction algorithm, or the like, which helps to speed up training. This creates an opportunity to separately train (or pre-train) or define some layers in the deep learning network.

In some embodiments, the aforementioned trained network is obtained based on training by a training module on an external carrier (for example, an apparatus outside the medical imaging system). In some embodiments, the training module trains the network based on a original sample image set and a sample noise image set and based on a DNCNN or other well-known models. In some embodiments, the training system may include a first module configured to store a training data set, a second module configured to perform training and/or update based on a model, and a communication network configured to connect the first module and the second module. In some embodiments, the first module includes a first processing unit and a first storage unit, where the first storage unit is configured to store the training data set, and the first processing unit is configured to receive a relevant instruction (for example, acquiring a training data set) and send the training data set according to the instruction. In addition, the second module includes a second processing unit and a second storage unit, where the second storage unit is configured to store a training model, and the second processing unit is configured to receive a relevant instruction and perform training and/or update of the network. In some other embodiments, the training data set may further be stored in the second storage unit of the second module, and the training system may not include the first module. In some embodiments, the communication network may include various connection types, such as wired or wireless communication links, or fiber-optic cables.

Once data (for example, a trained network) is generated and/or configured, the data can be replicated and/or loaded into the medical imaging system 10, which may be accomplished in a different manner. For example, models may be loaded via a directional connection or link between the medical imaging system 10 and the computer 40. In this regard, communication between different elements may be accomplished using an available wired and/or wireless connection and/or based on any suitable communication (and/or network) standard or protocol. Alternatively or additionally, the data may be indirectly loaded into the medical imaging system 10. For example, the data may be stored in a suitable machine-readable medium (for example, a flash memory card), and then the medium is used to load the data into the medical imaging system 10 (for example, by a user or an authorized person of the system on site); or the data may be downloaded to an electronic apparatus (for example, a notebook computer) capable of local communication, and then the apparatus is used on site (for example, by a user or an authorized person of the system) to upload the data to the medical imaging system 10 via a direct connection (for example, a USB connector).

As discussed herein, the deep learning technology (also referred to as deep machine learning, hierarchical learning, deep structured learning, or the like) employs an artificial neural network for learning. The deep learning method is characterized by using one or a plurality of network architectures to extract or simulate data of interest. The deep learning method may be implemented using one or a plurality of processing layers (for example, an input layer, an output layer, a convolutional layer, a normalization layer, or a sampling layer, where processing layers of different numbers and functions may exist according to different deep network models), where the configuration and number of the layers allow a deep network to process complex information extraction and modeling tasks. Specific parameters (or referred to as "weight" or "bias") of the network are usually estimated through a so-called learning process (or training process). The learned or trained parameters usually result in (or output) a network corresponding to layers of different levels, so that extraction or simulation of different aspects of initial data or the output of a previous layer usually may represent the hierarchical structure or concatenation of layers. During image processing or reconstruction, this may be represented as different layers with respect to different feature levels in the data. Thus, processing may be performed layer by layer. That is, "simple" features may be extracted from input data for an earlier or higher-level layer, and then these simple features are combined into a layer exhibiting features of higher complexity. In practice, each layer (or more specifically, each "neuron" in each layer) may process input data as output data for representation using one or a plurality of linear and/or non-linear transformations (so-called activation functions). The number of the plurality of "neurons" may be constant among the plurality of layers or may vary from layer to layer.

As discussed herein, as part of initial training of a deep learning process to solve a specific problem, a training data set includes a known input value (for example, a sample image or a pixel matrix of the image subjected to coordinate transformation) and an expected (target) output value (for example, an image or an identification and judgment result) finally outputted in the deep learning process. In this manner, a deep learning algorithm can process the training data set (in a supervised or guided manner or an unsupervised or unguided manner) until a mathematical relationship between a known input and an expected output is identified and/or a mathematical relationship between the input and output of each layer is identified and represented. In the learning process, (part of) input data is usually used, and a network output is created for the input data. Afterwards, the created network output is compared with the expected output of the data set, and then a difference between the created and expected outputs is used to iteratively update network parameters (weight and/or bias). A stochastic gradient descent (SGD) method may usually be used to update network parameters. However, those skilled in the art should understand that other methods known in the art may also be used to update network parameters. Similarly, a separate validation data set may be used to validate a trained network, where both a known input and an expected output are known. The known input is provided to the trained network so that a network output can be obtained, and then the network output is compared with the (known) expected output to validate prior training and/or prevent excessive training.

Figure 6:
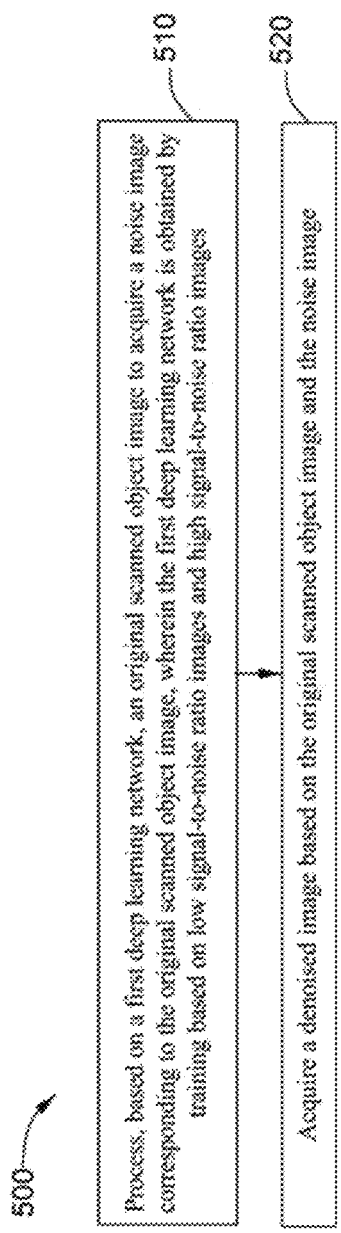
FIG. 6 is a flowchart of an image noise reduction method according to some embodiments of the present disclosure.

FIG. 6 is a flowchart of an image noise reduction method 500 according to some embodiments of the present disclosure. As shown in FIG. 6, the image noise reduction method 500 includes step 510 and step 520.

In step 510, based on a first deep learning network, an original scanned object image is processed to acquire a noise image corresponding to the original scanned object image, wherein the first deep learning network is obtained by training based on low signal-to-noise ratio images and high signal-to-noise ratio images. In some embodiments, the first deep learning network is obtained by training based on a DNCNN model, and data preparation regarding training of the first deep learning network will be further described below with reference to FIG. 7.

In step 520, a denoised image is acquired based on the original scanned object image and the noise image.

Figure 7:
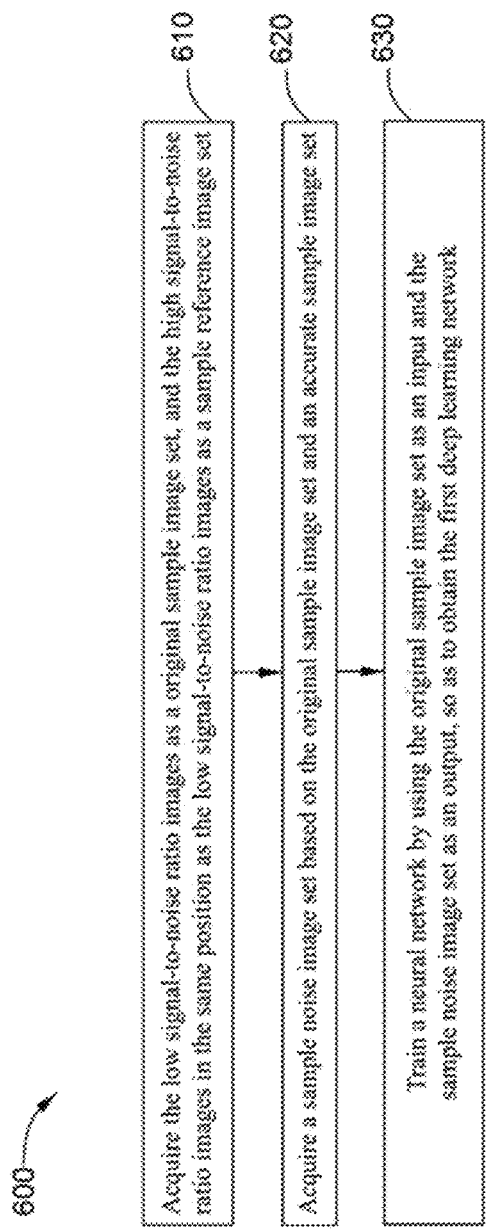
FIG. 7 is a flowchart of a method of training of a first deep learning network in the image noise reduction method shown in FIG. 6.

FIG. 7 is a flowchart of a method 600 of training a first deep learning network according to some embodiments of the present disclosure. As shown in FIG. 7, the method 600 of training a first deep learning network includes step 610, step 620, and step 630.

In step 610, the low signal-to-noise ratio images are acquired as a original sample image set, and the high signal-to-noise ratio images in the same position as the low signal-to-noise ratio images are acquired as a sample reference image set. In some embodiments, the original sample image set and the sample reference image set are acquired by scanning a phantom.

In some embodiments, the low signal-to-noise ratio images include CT images acquired at a plurality of different doses.

In some embodiments, the original sample image set includes a plurality of blocks in the low signal-to-noise ratio images, and the sample reference image set includes a plurality of blocks in the high signal-to-noise ratio images. Specifically, each CT image is divided into a plurality of blocks, for example, blocks with a size of 40*40, and then each of the blocks is trained respectively. By dividing each CT image into a plurality of blocks, the accuracy of training of a deep learning network can be improved to obtain a more accurate denoised image.

Specifically, the original sample image set includes respective blocks in the low signal-to-noise ratio images and at least one transformed block obtained after transformation processing is performed on the respective blocks, and the sample reference image set includes respective blocks in the high signal-to-noise ratio images and at least one transformed block obtained after transformation processing is performed on the blocks. The transformation processing includes at least one of rotation of at least one angle and mirror flip, such as one or a plurality of rotation of each block of 90 degrees, 180 degrees, and 270 degrees or mirror flip. By performing different processing on a plurality of blocks, more training data can be obtained, and the deep learning network is better trained, thereby avoiding the situation in which the deep learning network cannot be denoised due to different shooting angles In step 620, a sample noise image set is acquired based on the original sample image set and the sample reference image set.

In some embodiments, the original sample image set includes a plurality of low signal-to-noise ratio images acquired based on phantom scanning, and the sample noise image set includes an actual sample noise image set generated based on the plurality of low signal-to-noise ratio images and the sample reference image set. Specifically, since the high-dose CT image is a substantially noise-free reference image, an actual noise image can be acquired by subtracting the substantially noise-free reference image from the actual image with more noise.

In some other embodiments, the sample noise image set further includes a virtual sample noise image set generated based on a second deep learning network. The virtual sample noise image set includes at least one virtual noise image which is generated based on the second deep learning network and has a preset similarity to each actual sample noise image of the actual sample noise image set. The original sample image set further includes a virtual original sample image set acquired based on the sample reference image set and the virtual sample noise image set.

In some embodiments, the second deep learning network is obtained by training based on GAN or other well-known models. By inputting an actual sample noise image as a reference image into the discriminative model, the discriminative model can determine a similarity between an image generated by the generative model and the reference image. When a preset similarity is reached, the second deep learning network can output a corresponding virtual noise image, that is, for one actual noise image, a plurality of corresponding virtual noise images can be outputted. Generating more noise images by the second deep learning network is actually a method of data amplification. Based on the reference noise images, more similar noise images can be generated, and these noise images are inputted into the first deep learning network, thereby also improving the capability of noise reduction of the first deep learning network.

In step 630, a neural network is trained by using the original sample image set as an input and the sample noise image set as an output, so as to obtain the first deep learning network. Specifically, the original sample image set includes actual CT images obtained by scanning a phantom at different low doses, as well as virtual CT images synthesized virtual noise images generated based on the second deep learning network and substantially noise-free reference images obtained by scanning at a high dose. The sample noise image set includes actual noise images obtained by subtracting high-dose CT images from low-dose CT images, and virtual noise images generated based on the second deep learning network The image noise reduction method based on artificial intelligence proposed in the present disclosure can more accurately denoise images acquired by low-dose scanning, and improve the quality of the images on the condition of reducing the radiation to a patient as much as possible. By acquiring a denoised image based on a deep learning network, and then subtracting the noise image from the original scanned object image, the obtained denoised image can be more accurate. By performing data amplification (rotation and/or flip of image blocks, and generation of more similar noise images) in the training of the deep learning network, the processing accuracy of the deep learning network can be increased, and images as precisely as possible are acquired. By scanning a phantom at low doses and high doses respectively, not only comply with human ethics, but also can implement substantially noise-free reference images, as well as accurate pairing between original images with more noise and substantially noise-free reference images.

The present disclosure may further provide a non-transitory computer-readable storage medium for storing an instruction set and/or a computer program. When executed by a computer, the instruction set and/or computer program causes the computer to perform the aforementioned image noise reduction method. The computer executing the instruction set and/or computer program may be a computer of a medical imaging system, or may be other devices/modules of the medical imaging system. In one embodiment, the instruction set and/or computer program may be programmed into a processor/controller of the computer.

Specifically, when executed by the computer, the instruction set and/or computer program causes the computer to: processing, based on a first deep learning network, an original scanned object image to acquire a noise image corresponding to the original scanned object image; and acquiring a denoised image based on the original scanned object image and the noise image.

The instructions described above may be combined into one instruction for execution, and any of the instructions may also be split into a plurality of instructions for execution. Moreover, the present disclosure is not limited to the instruction execution order described above.

As used herein, the term "computer" may include any processor-based or microprocessor-based system including a system that uses a microcontroller, a reduced instruction set computer (RISC), an application specific integrated circuit (ASIC), a logic circuit, and any other circuit or processor capable of executing the functions described herein. The above examples are merely exemplary and thus are not intended to limit the definition and/or meaning of the term "computer" in any way.

The instruction set may include various commands that instruct a computer acting as a processor or instruct a processor to perform particular operations, such as the methods and processes of various embodiments. The instruction set may be in the form of a software program, and the software program can form part of one or a plurality of tangible, non-transitory computer-readable media. The software may be in various forms such as system software or application software. In addition, the software may be in the form of a set of independent programs or modules, a program module within a larger program, or part of a program module. The software may also include modular programming in the form of object-oriented programming. The input data may be processed by the processor in response to an operator command, or in response to a previous processing result, or in response to a request made by another processor.

Some exemplary embodiments have been described above; however, it should be understood that various modifications may be made. For example, if the described techniques are performed in a different order and/or if the components of the described system, architecture, device, or circuit are combined in other manners and/or replaced or supplemented with additional components or equivalents thereof, a suitable result can be achieved. Accordingly, other implementations also fall within the scope of the claims.

The invention claimed is:

1. An image noise reduction method, comprising:
processing, based on a first deep learning network, an original scanned object image to acquire a noise image corresponding to the original scanned object image; and
acquiring a denoised image based on the original scanned object image and the noise image;
wherein the first deep learning network is obtained by training based on low signal-to-noise ratio images and high signal-to-noise ratio images, wherein the low signal-to-noise ration images are an original sample image set;
wherein the original sample image set comprises a plurality of blocks in the low signal-to-noise ratio images and at least one transformed block obtained after transformation processing is performed on the respective block, wherein the transformation processing comprises at least one of rotation of at least one angle and mirror flip.

2. The image noise reduction method according to claim 1, wherein the training comprises:
acquiring the high signal-to-noise ratio images in the same position as the low signal-to-noise ratio images as a sample reference image set;
obtaining a sample noise image set based on the original sample image set and the sample reference image set; and
training a neural network by using the original sample image set as an input and the sample noise image set as an output, so as to obtain the first deep learning network.

3. The image noise reduction method according to claim 2, wherein the low signal-to-noise ratio images comprise CT images acquired at a plurality of different low doses.

4. The image noise reduction method according to claim 2, wherein the sample reference image set comprises a plurality of blocks in the high signal-to-noise ratio images.

5. The image noise reduction method according to claim 4, wherein the sample reference image set comprises respective blocks in the high signal-to-noise ratio images and at least one transformed block obtained after transformation processing is performed on the blocks.

6. The image noise reduction method according to claim 2, wherein the original sample image set comprises a plurality of low signal-to-noise ratio images acquired based on phantom scanning, and the sample noise image set comprises an actual sample noise image set generated based on the plurality of low signal-to-noise ratio images and the sample reference image set.

7. The image noise reduction method according to claim 6, wherein the sample noise image set further comprises a virtual sample noise image set generated based on a second deep learning network.

8. The image noise reduction method according to claim 7, wherein the virtual sample noise image set comprises at least one virtual noise image generated based on the second deep learning network, and the at least one virtual noise image has a preset similarity to one actual sample noise image in the actual sample noise image set.

9. The image noise reduction method according to claim 8, wherein the original sample image set further comprises a virtual original sample image set acquired based on the sample reference image set and the virtual sample noise image set.

10. An image noise reduction device, comprising:
a noise image generation module, configured to process, based on a first deep learning network, an original scanned object image to acquire a noise image corresponding to the original scanned object image, wherein the first deep learning network is obtained by training based on low signal-to-noise ratio images and high signal-to-noise ratio images, wherein the low signal-to-noise ration images are an original sample image set;
wherein the original sample image set comprises a plurality of blocks in the low signal-to-noise ratio images and at least one transformed block obtained after transformation processing is performed on the respective block, wherein the transformation processing comprises at least one of rotation of at least one angle and mirror flip; and
a denoised image synthesis module, configured to acquire a denoised image based on the original scanned object image and the noise image.

11. The image noise reduction device according to claim 10, further comprising a first training module configured to acquire the first deep learning network, wherein the first training module is further configured to:
acquire the high signal-to-noise ratio images in the same position as the low signal-to-noise ratio images as a sample reference image set;
acquire a sample noise image set based on the original sample image set and the sample reference image set; and
train a neural network by using the original sample image set as an input and the sample noise image set as an output, so as to obtain the first deep learning network.

12. The image noise reduction device according to claim 11, wherein the low signal-to-noise ratio images comprise CT images acquired at a plurality of different low doses.

13. The image noise reduction device according to claim 11, wherein the sample reference image set comprises a plurality of blocks in the high signal-to-noise ratio images.

14. The image noise reduction device according to claim 13, wherein the sample reference image set comprises respective blocks in the high signal-to-noise ratio images and at least one transformed block obtained after transformation processing is performed on the blocks.

15. The image noise reduction device according to claim 11, wherein the original sample image set comprises a plurality of low signal-to-noise ratio images acquired based on phantom scanning, and the sample noise image set comprises an actual sample noise image set generated based on the plurality of low signal-to-noise ratio images and the sample reference image set.

16. The image noise reduction device according to claim 15, further comprising:
a second training module, configured to generate a second deep learning network of a virtual sample noise image set based on the actual sample noise image set.

17. The image noise reduction device according to claim 16, wherein the virtual sample noise image set comprises at least one virtual noise image generated based on the second deep learning network, and the at least one virtual noise image has a preset similarity to one actual sample noise image in the actual sample noise image set.

18. The image noise reduction device according to claim 16, wherein the original sample image set further comprises a virtual original sample image set acquired based on the sample reference image set and the virtual sample noise image set.

* * * * *